(12) United States Patent
Corio

(10) Patent No.: US 8,459,249 B2
(45) Date of Patent: Jun. 11, 2013

(54) SINGLE AXIS SOLAR TRACKING SYSTEM

(76) Inventor: Ronald P. Corio, Albuquerque, NM (US)

( * ) Notice: Subject to any disclaimer, the term of this patent is extended or adjusted under 35 U.S.C. 154(b) by 603 days.

(21) Appl. No.: 12/137,764

(22) Filed: Jun. 12, 2008

(65) Prior Publication Data
US 2008/0308091 A1 Dec. 18, 2008

Related U.S. Application Data

(60) Provisional application No. 60/934,557, filed on Jun. 15, 2007.

(51) Int. Cl.
*F24J 2/38* (2006.01)

(52) U.S. Cl.
USPC ............ 126/600; 126/605; 126/606; 126/607

(58) Field of Classification Search
USPC ........................ 126/577, 606, 607, 600, 605
See application file for complete search history.

(56) References Cited

U.S. PATENT DOCUMENTS

| | | | | | |
|---|---|---|---|---|---|
| 1,047,554 | A | * | 12/1912 | Nichols ......................... | 126/607 |
| 1,683,266 | A | * | 9/1928 | Shipman ....................... | 126/683 |
| 2,133,649 | A | * | 10/1938 | Abbot ........................... | 126/608 |
| 2,371,984 | A | * | 3/1945 | Forsyth ........................ | 74/574.3 |
| 2,749,903 | A | * | 6/1956 | Auster ............................ | 126/42 |
| 2,777,122 | A | * | 1/1957 | Hedeman, Jr. et al. ........ | 342/372 |
| 2,790,440 | A | * | 4/1957 | Adair, Jr. ......................... | 601/92 |
| 2,857,634 | A | * | 10/1958 | Garbade et al. ................. | 49/77.1 |
| 3,359,819 | A | * | 12/1967 | Veillette et al. ................. | 74/409 |
| 4,027,653 | A | * | 6/1977 | Meckler ......................... | 126/605 |
| 4,056,313 | A | * | 11/1977 | Arbogast .......................... | 353/3 |
| 4,064,865 | A | * | 12/1977 | Depew .......................... | 126/603 |
| 4,077,392 | A | * | 3/1978 | Garner .......................... | 126/600 |
| 4,095,369 | A | * | 6/1978 | Posnansky et al. ............ | 47/22.1 |
| 4,098,264 | A | * | 7/1978 | Brokaw ........................ | 126/578 |
| 4,108,154 | A | * | 8/1978 | Nelson .......................... | 126/576 |
| 4,116,221 | A | * | 9/1978 | Zaugg et al. ................... | 126/605 |
| 4,135,493 | A | * | 1/1979 | Kennedy ....................... | 126/577 |
| 4,149,523 | A | * | 4/1979 | Boy-Marcotte et al. ....... | 126/589 |
| 4,172,443 | A | * | 10/1979 | Sommer ....................... | 126/680 |
| 4,184,482 | A | * | 1/1980 | Cohen .......................... | 126/606 |
| 4,202,321 | A | * | 5/1980 | Volna ........................... | 126/605 |
| 4,202,322 | A | * | 5/1980 | Delgado et al. ............... | 126/574 |
| 4,227,513 | A | * | 10/1980 | Blake et al. ................... | 126/578 |
| 4,243,018 | A | * | 1/1981 | Hubbard ....................... | 126/576 |
| 4,269,168 | A | * | 5/1981 | Johnson ........................ | 126/607 |
| 4,276,872 | A | * | 7/1981 | Blake et al. ................... | 126/578 |

(Continued)

FOREIGN PATENT DOCUMENTS
GB 2030268 A * 4/1980

*Primary Examiner* — Kenneth Rinehart
*Assistant Examiner* — Jorge Pereiro
(74) *Attorney, Agent, or Firm* — Dennis F. Armijo

(57) ABSTRACT

A solar tracking system with a torque tube supporting solar panels. Columns support the system and have bearings for rotation of the torque tube. A drive is coupled to the torque tube and is driven by a gearbox, such as a worm gear assembly, for rotating the array of solar panels to follow the sun's diurnal motion. The array can rotate in an opposite direction, or backtrack, to prevent shadowing from one module row to another. Multiple gearboxes can be mechanically linked by drive shafts and driven by a single motor. The drive shafts may incorporate universal joints for uneven terrain or staggered configurations. Harmonic dampers can be affixed to the solar panels to decouple wind forces which allows the use of larger solar panels.

25 Claims, 12 Drawing Sheets

U.S. PATENT DOCUMENTS

| | | | |
|---|---|---|---|
| 4,281,641 A * | 8/1981 | Devore | 126/605 |
| 4,284,839 A * | 8/1981 | Johnson | 136/246 |
| 4,297,521 A * | 10/1981 | Johnson | 136/248 |
| 4,306,540 A * | 12/1981 | Hutchison | 126/607 |
| 4,314,545 A * | 2/1982 | Bowman | 126/604 |
| 4,323,052 A * | 4/1982 | Stark | 126/571 |
| 4,340,812 A * | 7/1982 | Mori | 250/203.1 |
| 4,349,011 A * | 9/1982 | Hartsog | 126/601 |
| 4,380,013 A * | 4/1983 | Slysh | 343/753 |
| 4,429,178 A | 1/1984 | Prideaux et al. | |
| 4,432,343 A * | 2/1984 | Riise et al. | 126/602 |
| 4,469,938 A * | 9/1984 | Cohen | 250/203.4 |
| 4,548,195 A * | 10/1985 | Balhorn | 126/602 |
| 4,559,926 A * | 12/1985 | Butler | 126/578 |
| 4,968,355 A * | 11/1990 | Johnson | 136/246 |
| 5,052,150 A * | 10/1991 | Chen | 49/82.1 |
| 5,228,924 A * | 7/1993 | Barker et al. | 136/246 |
| 5,353,472 A * | 10/1994 | Benda et al. | 16/2.2 |
| 5,870,799 A * | 2/1999 | Benda | 16/2.1 |
| 5,924,415 A * | 7/1999 | Esteverena | 126/681 |
| 6,058,930 A | 5/2000 | Shingleton | |
| 6,079,408 A * | 6/2000 | Fukuda | 126/578 |
| 6,159,409 A * | 12/2000 | Benda | 264/255 |
| 6,239,353 B1 * | 5/2001 | Hall et al. | 136/246 |
| 6,805,332 B2 * | 10/2004 | Crawley | 251/172 |
| 7,140,475 B1 * | 11/2006 | Appelqvist | 188/186 |
| 7,192,146 B2 * | 3/2007 | Gross et al. | 359/853 |
| 7,240,674 B2 * | 7/2007 | Patterson | 126/573 |
| 7,343,913 B2 * | 3/2008 | Niedermeyer | 126/696 |
| 7,401,610 B1 * | 7/2008 | Cherry | 126/42 |
| 7,474,013 B2 * | 1/2009 | Greenspan et al. | 290/53 |
| 7,476,832 B2 * | 1/2009 | Vendig et al. | 250/203.4 |
| 7,554,030 B2 * | 6/2009 | Shingleton | 136/246 |
| 2004/0238025 A1 | 12/2004 | Shingleton | |
| 2004/0261955 A1 * | 12/2004 | Shingleton et al. | 160/84.06 |
| 2005/0109384 A1 * | 5/2005 | Shingleton et al. | 136/244 |
| 2005/0284467 A1 * | 12/2005 | Patterson | 126/580 |
| 2006/0201437 A1 * | 9/2006 | Ryan | 119/165 |
| 2007/0034207 A1 * | 2/2007 | Niedermeyer | 126/600 |
| 2008/0040990 A1 * | 2/2008 | Vendig et al. | 52/173.3 |
| 2008/0251115 A1 * | 10/2008 | Thompson et al. | 136/251 |
| 2009/0145474 A1 * | 6/2009 | Pang | 136/248 |
| 2010/0051015 A1 * | 3/2010 | Ammar | 126/600 |
| 2010/0051016 A1 * | 3/2010 | Ammar | 126/600 |
| 2010/0101630 A1 * | 4/2010 | Kats et al. | 136/246 |

* cited by examiner

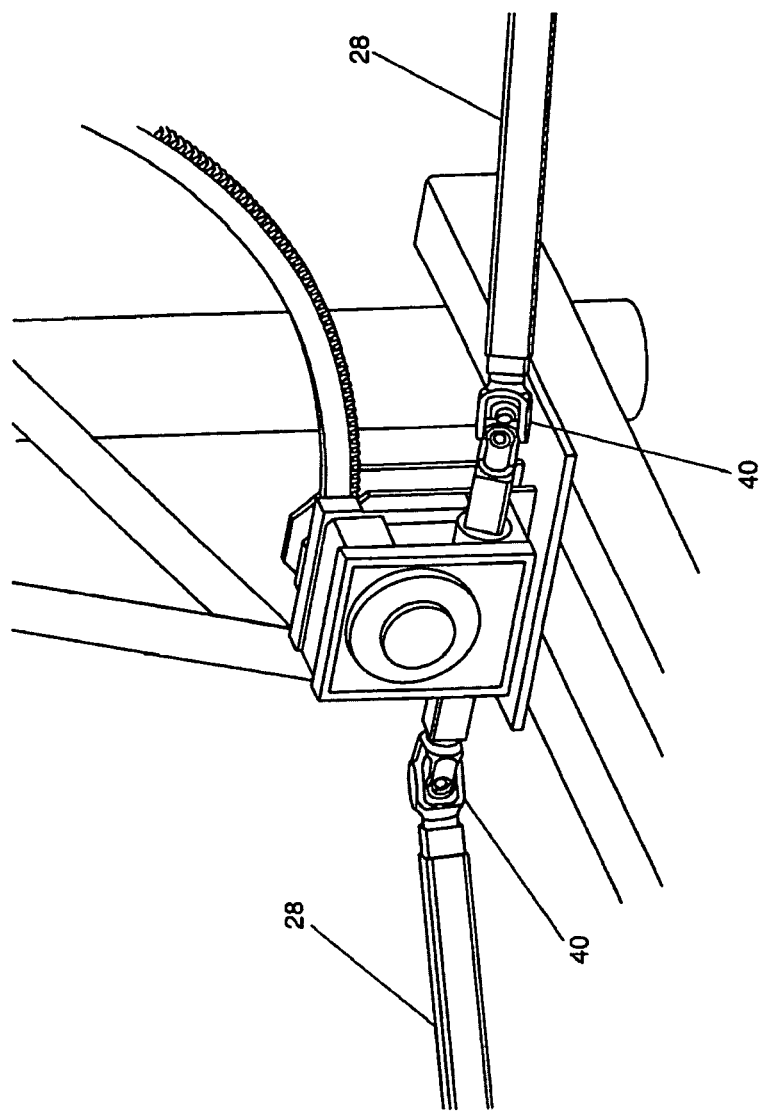

SINGLE AXIS SOLAR TRACKING SYSTEM

RELATED APPLICATIONS

This application claims the benefit of provisional U.S. Application Ser. No. 60/934,557, entitled "SINGLE AXIS SOLAR TRACKING SYSTEM" filed Jun. 15, 2007, which is incorporated herein by reference in its entirety.

BACKGROUND OF THE INVENTION

1. Field of the Invention (Technical Field)

The presently claimed invention relates to solar energy production and more particularly to a method and apparatus for constructing mechanically linked, single axis solar tracking systems of various tracking geometries to follow the diurnal motion of the sun.

2. Background Art

Solar tracking systems utilized in renewable energy production are devices that track the motion of the sun relative to the earth to maximize the production of solar energy. Solar trackers move to keep solar modules perpendicular to the sun in either one or two axes. The presently claimed invention applies to photovoltaic modules (PV) for generating electrical powers but may be applied to any solar energy collection device, such as solar thermal or materials exposure testing devices.

Solar trackers have been successfully deployed in the industry, however the prior art designs have not adequately addressed the initial installation costs, flexibility in adaptation to site conditions and reliability over the relatively long lifetime (20+ years) of the system. In choosing a solar tracker system, one must consider all of the following variables:

PV module cost,
land cost, site geometry and availability,
installation labor cost,
material cost,
meteorological data,
operation and maintenance costs,
overall efficiency increase that the tracker provides.

The state of the art approaches have not fully optimized the combination of all the relevant cost issues.

The energy gain provided by trackers is dependent upon the tracking geometry of the system and the location of the installation. A dual axis (D/A) tracker keeps the collector perpendicular to the sun in both axis', and provides the greatest gain in energy production at any location. Single axis (S/A) trackers are fixed in one axis and typically track the daily motion of the sun in the other axis. Single axis tracker geometries include tilted elevation, azimuth, and horizontal. Tilted elevation S/A trackers are tilted as a function of the location's latitude and track the sun's daily motion about that tilted axis. Azimuth, S/A trackers are tilted at an optimum angle and follow the daily motion of the sun by rotating about the vertical axis. Horizontal S/A trackers are configured parallel to the ground and rotate about a North/South horizontal axis to track the sun's daily motion. The energy gained varies for each type of tracking geometry and is dependent upon the latitude of the installation and the weather conditions at the installation location. Solar tracking systems for PV modules are commercially available in single axis tilt and roll, single axis horizontal, single axis fixed tilt azimuth and dual axis geometries.

All trackers must be built strong enough to resist the wind forces in any tracking position or be "stowed" to reduce the effect of extreme wind forces. Modules also require periodic cleaning, which in many locations is primarily accomplished by rain "washing" the modules. Snow can impact tracker operations, due to the occurrence of ice or the weight of snow on modules, or snowdrifts that interfere with tracker movement and the collection of solar energy. In addition, construction materials, electronics, drive components, and motors must be able to operate within temperature and climate constraints.

In many applications, the horizontal single axis tracker is the most cost effective tracker geometry. A horizontal S/A tracker structure may be supported at many points along the rotating axis and therefore requires less complexity and less material for construction than other tracking geometries. The key to successful design of a tracking apparatus for PV modules is to provide the maximum overall economic benefit when considering many factors such as the initial apparatus cost, the installation cost, the land utilization, the cost and efficiency of the solar modules and the operation and maintenance costs as well as the efficiency gain provided by the tracking geometry. As the cost of steel and other fabrication material rises, the horizontal tracking geometry is increasingly desirable since it minimizes the structural material requirements by keeping the modules at a relatively low profile to the foundation and at a minimum overhung moment load relative to the rotating axis without requiring special connections to rotate the system about its center of gravity.

The prior art horizontal axis trackers typically have connected each row of modules together with a linear motion linkage in an effort to minimize the number of drive motors required. Prior art mechanically linked horizontal and tilted single axis tracking systems require substantial mechanical linkages structurally capable of resisting high force loading due to overhung solar module weight and large forces induced by the wind. The shortcoming of this prior art system is that all of the wind forces are concentrated to a single point, through the mechanical linkage. The embodiment of the presently claimed invention specifically eliminates the need for a robust mechanical linkage capable of resisting high-load forces induced by the wind. The design of the current embodiments eliminate the transmittance of these wind forces to the linkage, and counteracts the external wind forces locally, within each tracker row or array such that the wind force is not transmitted to the linkage. The prior art also requires a separate, large foundation, or foundations, to anchor a single drive mechanism that rotates many rows of modules with a linear motion motor. One such device is a horizontal, single axis tracking system described in U.S. Pat. No. 6,058,930, to Shingleton. In this system, the horizontal rows of modules are linked together with a linear motion linkage and operated by a single linear actuator attached to a separate, large foundation. Also, the prior art horizontal axis, mechanically linked trackers require generally flat or graded terrain for proper operation. Many columns must be installed at height elevations and locations requiring high tolerance within 100+ columns, across two dimensions in a large area, for mechanical linkages between rows to line up for operation. This often requires extensive and costly site preparation. Some prior art linked horizontal trackers have embodiments that allow for installation on undulating terrain, but require expensive joints that must be fabricated onsite that also must resist the large forces induced by the wind. These high force loaded pivoting joints are generally complicated and expensive to construct. Another disadvantage of the prior art is that they are designed as large rectangles with a linkage running down the center of array field. If the installation field is not suitable in the shape of a rectangle, these systems are often employed in less than optimum configurations where fewer modules are controlled by the linkage. This is another cost increase factor for the prior art in many installations.

The linear motion linkage of the prior art represents an excess of material and a labor-intensive installation cost component. The linkage must be robust, to directly resist the force of an entire field of many rows of trackers to one large linear drive that must be affixed to a large separate linear actuator drive foundation. The separate, large foundation is necessary to anchor the drive mechanism and must resist very high forces induced by the wind to the entire tracker field. Also, the flexibility in site layout is impacted by the linear motion linkage since the drive connection must run generally centered in the rows and be installed in a straight perpendicular line. The mechanical linkage of the prior art must be fixed at a right angle to the torsion tube and cannot deviate from perpendicular, and therefore does not allow the system to conform to irregular installation site boundaries Tracking geometries other than the horizontal single axis require more land area for installation. In a field of trackers, all the tracker geometries except for the horizontal axis tracker must be spaced in two dimensions, east/west and north/south, so as not to shade each other. The horizontal axis tracker need only be spaced apart in the east/west dimension to alleviate shading and therefore requires much less land to implement. Land contour and shape also critically control the cost of the installation of most horizontal single axis tracker systems.

Another type of horizontal axis tracker is not linked together and typically includes multiple PV modules mounted astride a torque tube. These are designed as independently motor driven rows. These horizontal trackers are driven individually by a motor/gear drive system and the PV array is rotated about the center of gravity of the PV module tracking system. Rotating the array about the center of gravity eliminates the moment loads applied to the gear drive by the overhung weight of the solar modules. In order to rotate the array about the center of gravity, this type of horizontal tracker design requires more structural material and more costly torque tube connections and bearings than the present horizontal axis tracker embodiments. Other disadvantages of these tracker designs include a higher projected wind area that requires more structural material and large foundations to resist greater moment loads and larger capacity drives to overcome moment loading from the solar modules that are mounted at a larger distance from the torque tube due to the taller profile of the array. They also have more complex bearing and support points that rotate the PV modules about the center of gravity of the tracker And use a motor per single tracker row which equates to increased cost, maintenance and decreased reliability.

A third tracker geometry is a tilted, single axis tracker. Often termed a tilt and roll tracker, it is tilted in elevation and then rotates about that tilted axis. This type of tracker typically offers increased gain over a horizontal tracking system, but at an added cost that should be critically analyzed prior to deployment. These costs include: the requirement for more land due to the spacing necessary for shading in both the N/S and E/W dimensions and a more complex structure requiring more structural material as a result of increased projected height from foundation. These systems are also not capable of automatic stow during high winds since the elevation angle is fixed and therefore must be structurally capable of withstanding all wind forces. Another tilted single axis geometry is a fixed tilt azimuth tracker. A fixed tilt azimuth tracker is tilted in elevation and then rotates about a vertical axis. This design, although typically more structurally stable than a tilt and roll tracker, suffers from the same cost drawbacks as the tilt and roll design; although, the performance gain may make the tilted single axis geometry economic for some installations.

The last tracking geometry is a dual-axis (D/A) tracker. D/A trackers provide the greatest performance gain over all the aforementioned tracking geometries since they keep the solar modules perpendicular to the sun in both axes. There are; however, several practical disadvantages of these systems: more land is required due to spacing necessary for shading in two dimensions; a more complex structure is necessary that requires more structural material as a result of increased projected height from the earth and foundation; and a second drive axis for elevation is necessary, which increases complexity, expense and maintenance issues. Also, D/A systems typically use two drive motors per a relatively small surface area of solar modules that results in increases in both initial cost and subsequent maintenance costs. Some types of solar collectors, concentrating collectors for example, require D/A tracking to operate.

SUMMARY OF THE INVENTION

Disclosure of the Invention

An object of the presently claimed invention is to mechanically link multiple solar trackers in a large array configuration so that they may operate in unison, driven by a single motor and tracker controller, whereby the mechanical linkage system is favorably designed such that it must only be capable of withstanding the relatively low forces required to effect movement of the trackers without the requirement to resist the larger forces induced from the wind that is applied to the array of trackers. Another object of the presently claimed invention is to contain these external wind forces within the supports of each individual solar tracker so that no extra foundations or attachments are necessary. A further object is to apply the drive principals to various solar single-axis tracking geometries to maximize the economic performance for each solar tracking application.

The mechanical drive system of the presently claimed invention advantageously links multiple single axis trackers together, moving many trackers through a simple and structurally minimal linkage to decrease cost and increase long term reliability. The configuration of the mechanical linkage and gear drive assemblies allows the motor to move the linked trackers, yet eliminates the transmission of the external wind forces to the drive linkage. By exploiting the "one way" drive properties of the presently claimed invention, the mechanical linkage need only transmit the relatively small forces necessary to move the tracker, and is not subject to the relatively high forces induced by the wind on the tracker. An added benefit of the system is that a relatively small motor can move a large area of solar modules. The drive system of the presently claimed invention is applicable to all solar tracking geometries. The mechanical drive configuration results in a very reliable, flexible, low cost tracking method that is easy to install and maintain. The various embodiments of the presently claimed invention apply the drive system to the appropriate tracking geometry in order to maximize the economic benefit of the tracking system.

One aspect of the disclosed embodiments is to drive mechanically linked multiple rows of a horizontal S/A solar tracking collector assembly. Rows of solar modules are formed by affixing the solar modules to a generally horizontally positioned torsion tube having its long axis oriented in a north/south (N/S) direction. Each row includes one or more supports to the north and south of center and as well as the possible use of a center support. A bearing is affixed at each torsion tube support such that rotary motion of the torsion tube may be affected through a single stage worm-gear drive assembly or through a worm-drive gear assembly which includes a second stage gear that is affixed to the torsion tube and one or more supports. A driven, rotating drive shaft is affixed to both sides of the worm-drive assembly. The drive shaft may be positioned at right angles to the torsion tube and attached to each worm-gear drive to enable rotary motion of the torsion tube by applying rotary motion to the driven drive shaft. Back driving of the gearbox from wind forces applied to the system is virtually eliminated through the properties inherent in the design of the primary worm-drive gear assembly located at each tracker. The worm-drive gear assembly can be efficiently driven by the input of rotary motion from the drive shaft to the worm, but is very inefficient at transmitting rotary motion applied by the system on the worm-gear. Therefore, moment forces, induced by the wind, applied to the solar array cannot be effectively transmitted to the drive shaft linkage. The result is that the drive shaft does not need to resist the forces of the wind on the array and only transmits the driving force from the motor through a highly geared transmission system. This enables the drive shaft to be minimally constructed and allows for flexibility in its design and layout within the solar tracker array field.

A further embodiment of this aspect of the presently claimed invention is to incorporate articulating joints at the ends of each drive shaft to enable the tracker rows to vary in height and or to translate in the N/S direction. The articulated drive shaft adds flexibility in array field layout. Array fields using articulating drive shaft joints may be constructed on undulating or slanted terrain and may also be tailored to irregular installation site boundaries. The horizontal axis S/A tracker minimizes the required structural components, allows for a high-density ratio of installed modules to land area, and provides peak performance of a horizontal single axis solar tracking system through the use of a programmable backtracking scheme for early morning and late evening solar energy collection.

In addition to minimizing the number and weight of structural components, the horizontal tracking system reduces on-site construction labor and installation requirements. It also provides a means for stowing the array of modules in the event of a hurricane, typhoon or other potentially destructive weather event. Another object of the horizontal tracker embodiment is that even as module costs considerably decline, it should remain competitive as compared with fixed-mounted arrays since it incorporates a minimal amount of structural maternal.

A second embodiment of the claimed invention is to drive multiple tilt and roll S/A solar trackers using the same drive principles as in the horizontal tracking system. In this embodiment variations of the worm-drive gear system can be effectively used to drive multiple tilt and roll solar trackers in an array field using only one motor and controller. Articulating joints on the drive shafts may also be incorporated to achieve the same flexibility as in the horizontal S/A tracker application.

A third embodiment of the presently claimed invention is to incorporate the drive system into a field application of multiple fixed tilt azimuth trackers. A specially designed vertical axis bearing may be designed into the support post of the tracker to place the gear drive connection close to the base of the tracker support in order to provide clearance for the rotary drive linkage system underneath the solar module array. A more conventional bearing system, such as a slew drive may also be incorporated in the fixed tilt azimuth tracking geometry if it is properly designed to withstand the load forces applied near the base of the array support. Another favorable application of the drive system is to incorporate the linked worm-gear drive into a carousel type fixed tilt azimuth tracking array field. In this embodiment, the tilted solar array is rotated on a large area circular bearing to track the sun. The carousel tracker may also be constructed in a low profile design for rooftop applications.

The embodiments described in this application are intended to provide a cost effective, long life and low maintenance solution for implementing solar tracking of photovoltaic (PV) or other solar modules for solar energy applications. The presently claimed invention addresses the general problem of how best to mount and track PV modules in order to maximize the economic return from a system installation while incorporating a similar drive system and principles for each tracking geometry. Since the presently claimed invention may be incorporated in various tracking geometries it allows for consideration of the balance between module efficiency as it relates to solar tracking geometries, land use, materials utilization, operation and maintenance costs, weather and climate, and installation cost.

The current embodiment of the mechanically linked system is superior to the prior art because it eliminates the need for the drive system to resist the high load forces induced by the wind. Other benefits include the elimination of large separate foundation(s) to mount the drive system, the linkage requires less material than the prior art, the linkage also allows for much greater flexibility in field layout of the trackers and a single motor can drive a much larger tracker field.

The drive system of the presently claimed invention allows the linkage to be configured two ways: 1) with rigid connecting drive shafts for deployment on even terrain, or, 2) with articulating or universal joints at the end of the drive shafts for use on uneven terrain or irregularly-shaped layouts. Both linkages may be employed within a single tracker system to install on a field consisting of a combination of even and uneven terrain or irregularly shaped installation sites.

Other objects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the claimed invention. The objects and advantages of the claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the presently claimed invention and, together with the description, serve to explain the principles of the claimed invention. The drawings are only for the purpose of illustrating preferred embodiments of the claimed invention and are not to be construed as limiting the claimed invention The drawings are included in the description below.

FIG. 4 shows the articulating joints.

DESCRIPTION OF THE PREFERRED EMBODIMENTS

Best Modes for Carrying Out the Invention

The presently claimed invention has four embodiments, a horizontal axis, a fixed tilt azimuth, tilt and roll, and a carousel tracker with the commonality of being linked together mechanically and operated by a rotary driven worm-drive system. All the tracker geometries incorporate a worm-gear primary drive, either attached to the tracker frame directly or through a secondary stage such as a spur gear rack, D-ring chain drive, or cable system mounted to one or two column support for the tracker. The disclosed embodiment allows many tracker rows to be driven by one drive motor through the mechanical drive shaft linkage, which does not need to resist the external forces applied to the array.

Horizontal Single Axis

Figure 1A:
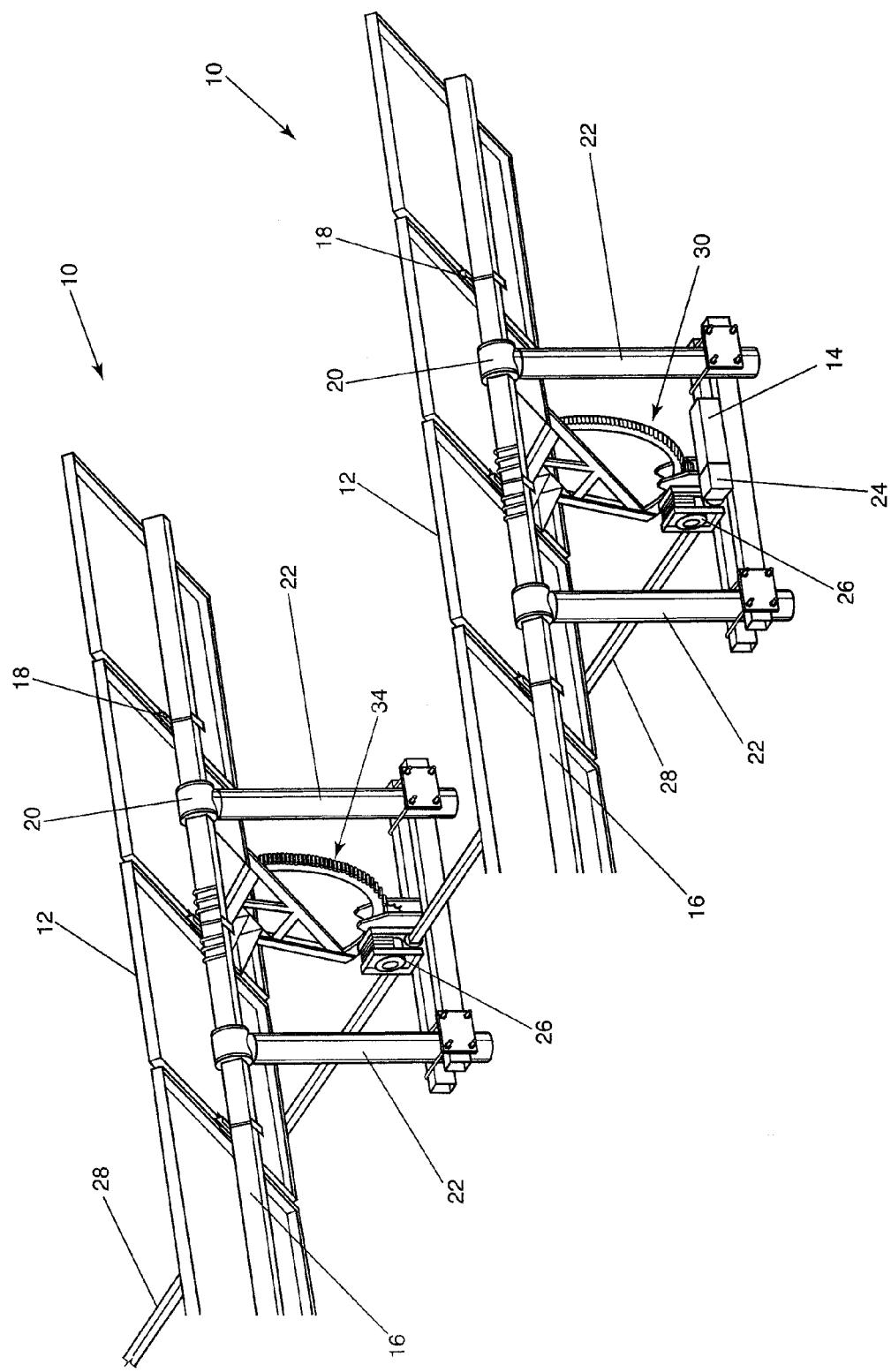
FIG. 1A shows the mechanically linked horizontal tracker embodiment with a worm-gear assembly for driving a spur gear rack and another worm-gear assembly for driving a D-Ring chain drive.
Figure 2:
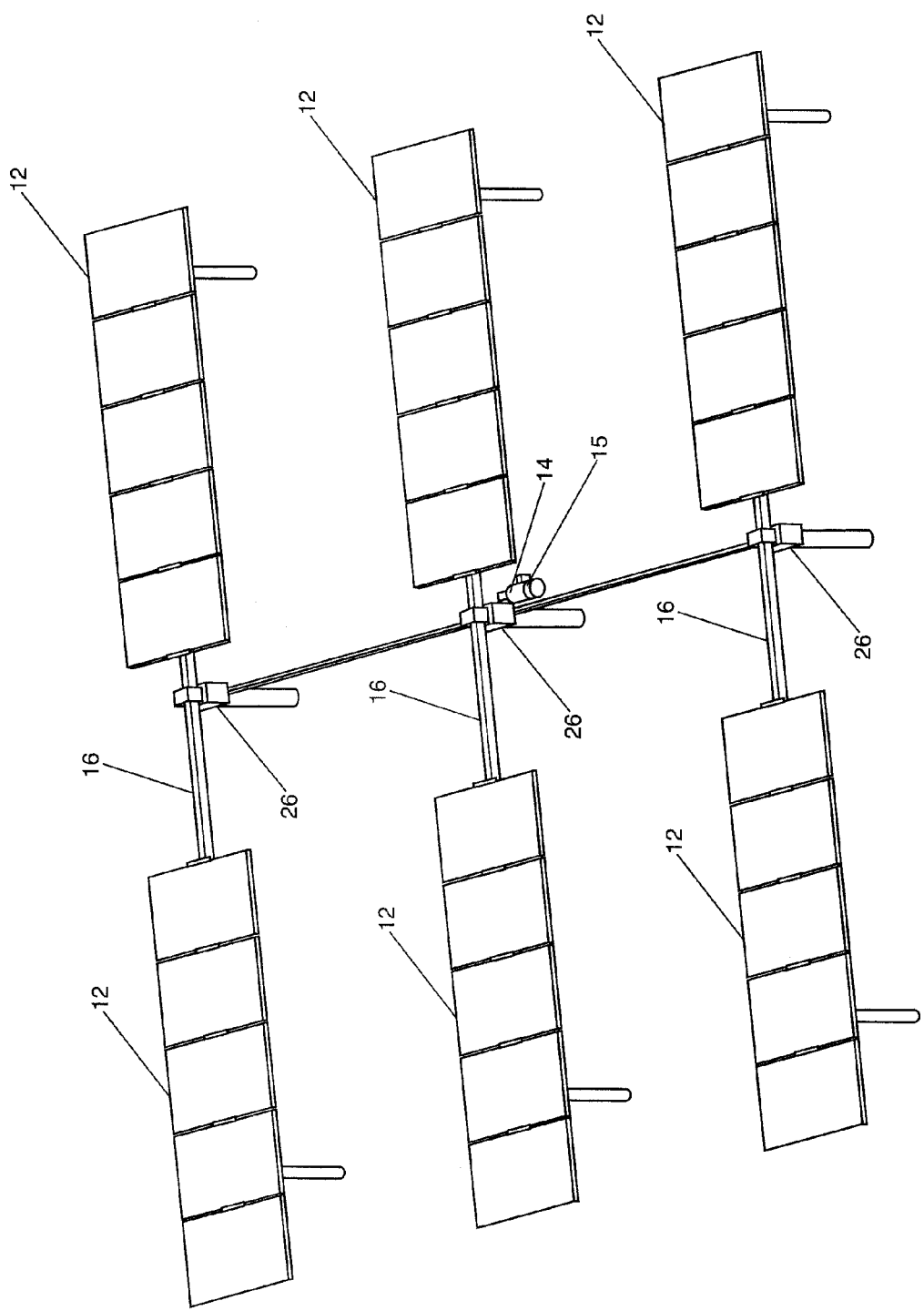
FIG. 2 shows a direct drive horizontal tracker system.

The mechanically linked horizontal, single axis embodiment of the presently claimed invention is a tracking assembly 10 for pointing one or more solar panels or PV modules 12 towards the sun, as shown in FIG. 1A. Drive mechanism 14, in this case a drive motor, provides the power to a drive shaft 28 and associated linkage to move PV modules 12. The preferred driving mechanism 14 is a drive motor with a brake 15 for limiting motor run on after de-energizing and resisting motor coast and back forces. In the embodiment of FIG. 1A, drive mechanism 14 rotates drive shaft 28, which in turn drives worm-gear assembly or drive box 26, as described below. In the embodiment shown in FIG. 1A, a drive worm gear assembly is transferring the power to drive shaft 28. This assembly utilizes a rotating torsion tube 16, in this case, horizontal, in the North/South direction, on which PV modules 12 are mounted, using mounting methods well known in the art, such as U bolts 18, clamps or other well know module mounting systems. Torsion tube 16 is inserted into bearings 20, with bearing surfaces such as no maintenance polymer bushings, which are attached to support columns 22. Drive mechanism or motor 14 drives a worm-gear drive box 26, which in turn, rotates the torsion tube 16 directly, as shown in FIG. 2, or drives a secondary element, which in turn drives the torsion tube. In FIG. 1A, the secondary element is a spur gear rack 30 or D-ring chain drive 34 which is affixed to torsion tube 16. The secondary element can also be a cable drive assembly or other drive assemblies well known in the art. (not shown). Thus, when activated by drive mechanism 14 PV modules 12 are rotated. A second, third, etc. tracking assembly, similar to tracking assembly 10 can be connected to drive shaft 28, in this embodiment on shaft end 30, with a separate and similar worm assembly. This can be repeated for several tracking assemblies. Thus, one motor 14 can drive a plurality of tracking assemblies. Mechanically linking the trackers in a field reduces the system complexity, operation and maintenance costs, and increases reliability.

FIG. 2 shows a direct drive horizontal tracker system. In this embodiment, motor 14 directly drives worm-gear assemblies 26, which rotates torsion tubes 16. This provides rotation movement to PV modules 12.

Figure 1B:
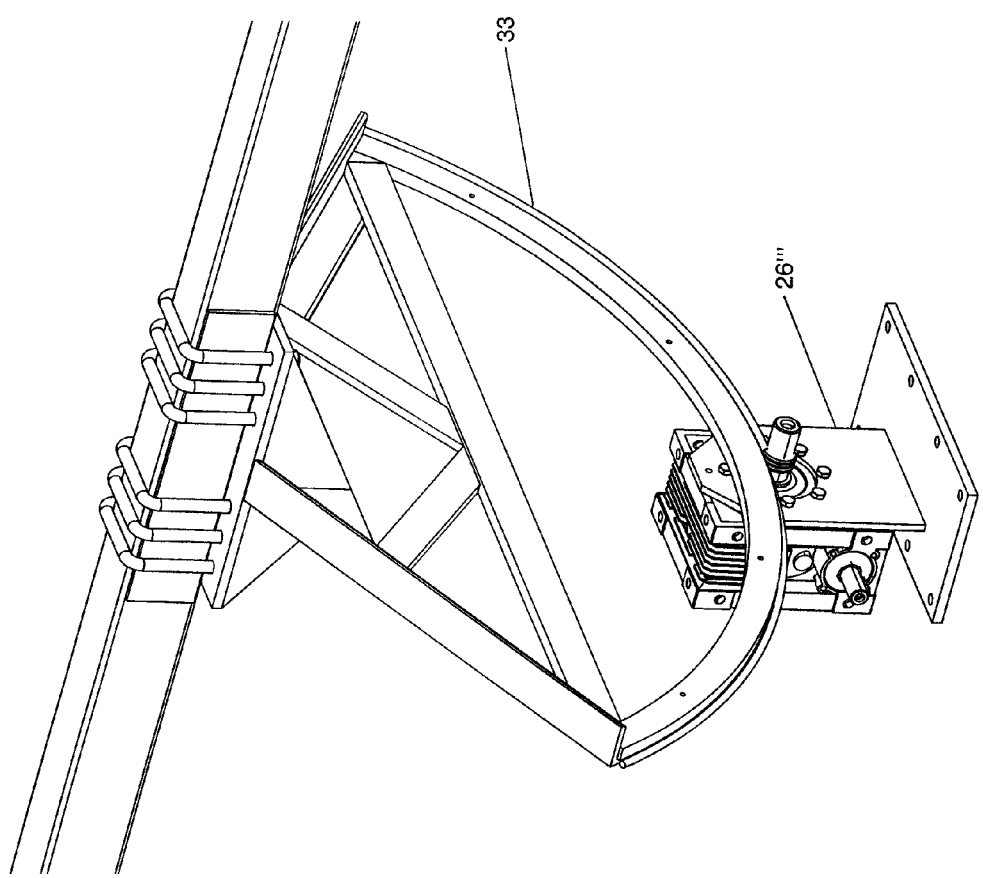
FIG. 1B shows a worm-gear assembly for driving a cable drive.
Figure 3A:
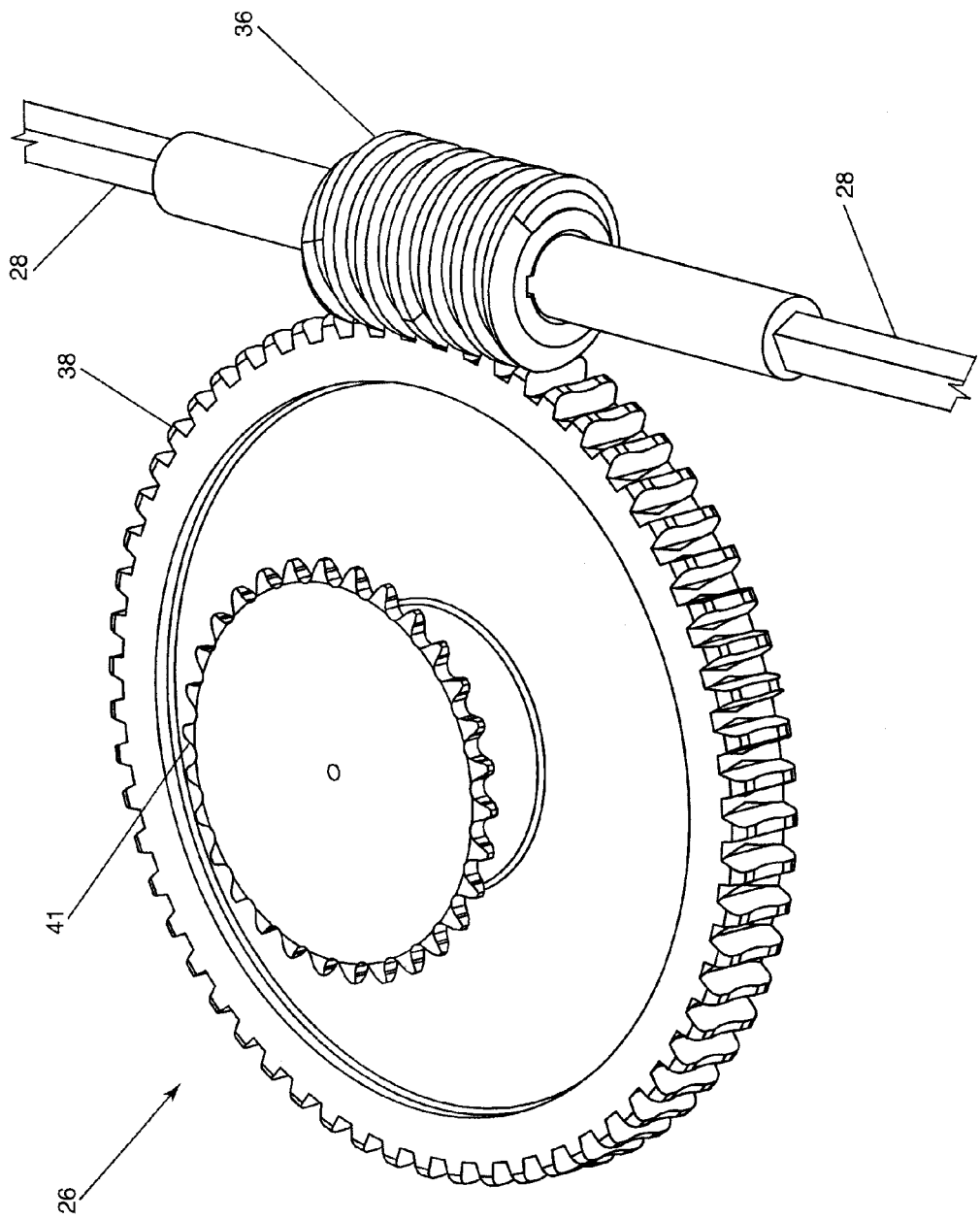
FIG. 3A shows the worm-gear assembly for the D-ring chain drive embodiment.
Figure 3B:
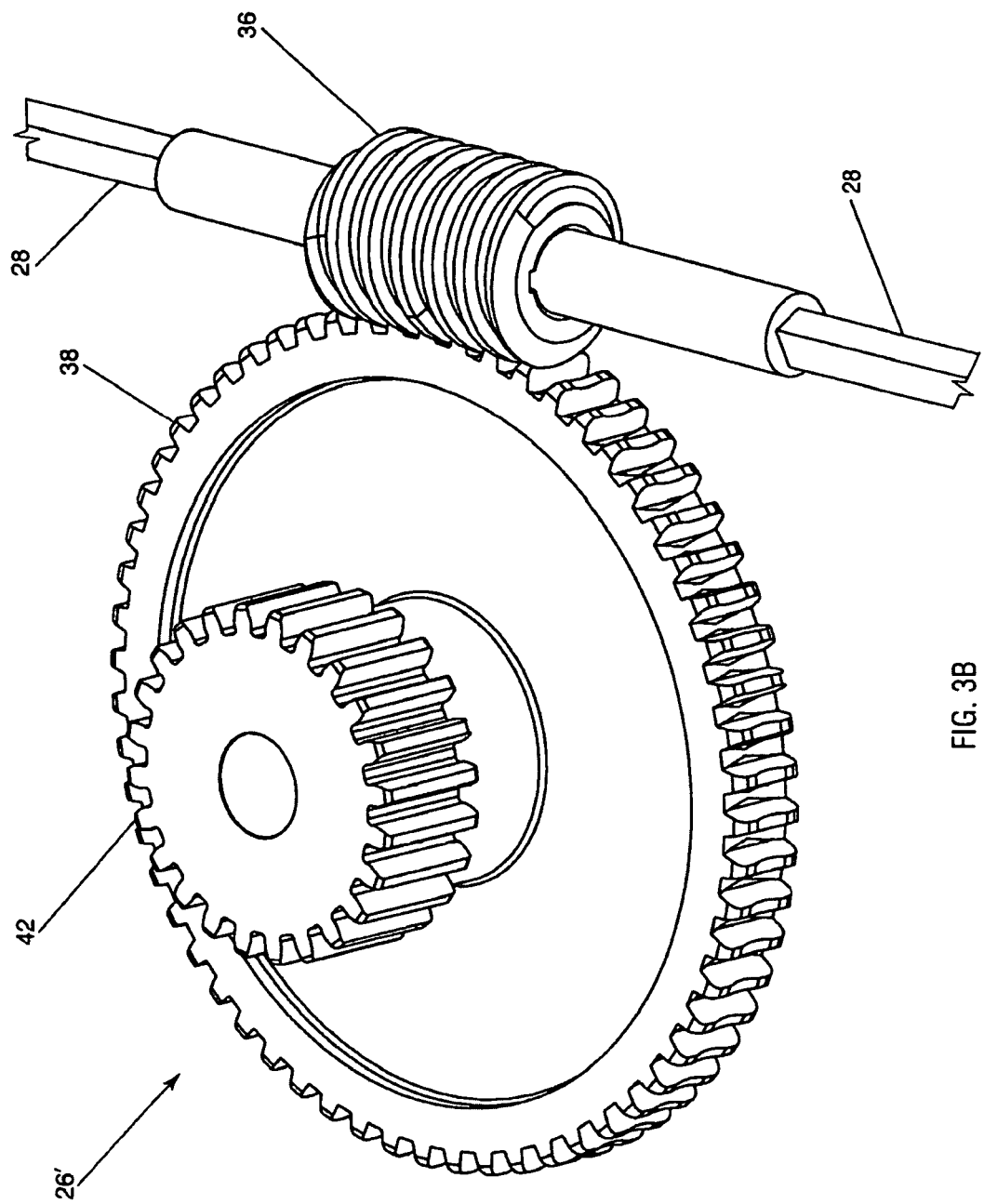
FIG. 3B shows the worm-ear assembly for the spur gear rack assembly.

FIGS. 3A and 3B show the worm-gear assemblies. One of the worm-gear assemblies 26 and 26' are provided at each tracker location and are driven by drive shaft or by drive mechanism. Typically this assembly contains worm 36 and worm-gear 38. Worm 36 is affixed to drive shaft 28 by means well known in the art. FIG. 3A shows worm-gear assembly 26 for driving a D-ring chain drive. Worm-gear 38 is affixed to sprocket 41 for D-ring chain drive assembly 34. FIG. 3B shows worm-gear assembly 26' for driving spur gear rack assembly 30 by affixing drive gear 42 of spur gear rack assembly 30 to worm-gear 38. Any combination of worm-gear assemblies 26 and 26' can be used in the four embodiments as described herein. FIG. 1B shows the worm-gear assembly 26" driving a cable drive 33.

With the mechanically linked worm-drive assembly 26 and 26' design, the site may be graded level to achieve the simplest installation. The mechanically linked design can also be deployed on an ungraded, slanted, or undulating terrain with the addition of articulating joints 40, such as swivel connections or universal joints in the drive shafts 28. FIG. 4 shows an embodiment of a tracker system for use on uneven terrain. Articulating joints 40 compensate for the non-linearity between the trackers in both the horizontal and vertical direction to allow drive shaft 28 connect to the next tracker without precision leveling and precise location of the next tracker in relation to the first tracker. Again, this articulating joint feature can be used with any of the embodiments disclosed herein.

If it is determined not to grade the site level, then only the columns for each single tracker row must be located with precision. Columns for subsequent trackers in a field may be located with little elevation tolerance relative to other tracker rows. Field site preparation, such as grading, is then minimized since the column height from tracker to tracker may be varied.

Referring again to FIG. 1A, support columns 22 are preferably fabricated from round steel galvanized tubing. In a ground based installation, multiple columns 22 are vertically attached to the earth in a straight line using a concrete foundation, columns driven into the ground, a screw type foundation or other foundation arrangement (not shown). For mounting to other structures such as a commercial rooftop or carport, columns 22 are attached to the structure support members (not shown). It may be desirable when mounting to another structure to use an A-Frame support design instead of a vertical tube column in order to distribute the forces over a greater area to the host structure (not shown).

Torque tube 16, preferably square, may be inserted into polymer UHMW bearings 20 designed to center the square torsion tube into the round bearing housing at the top of columns 22. This torque tube 16 may be comprised of several pieces joined together. The joints may be formed by a swaged connection where one tube is formed with a smaller section to fit into the next tube (not shown). These joints may then be welded together to insure a secure connection (not shown). All welds should be cleaned and painted to avert corrosion.

Bearing assembly 20, preferably UHMW bearings, is installed on the top of the columns 22, which preferably is a set of tubes joined at ninety degrees (90°), forming a tee. The vertical portion of the tube may form a sleeve to mount over or inside of column 22. This sleeve may be secured to the column with set bolts that burrow into the round column, and may be further secured with a roll pin pressed into a hole in the two parts, or may simply be welded to the column. Bearing assembly 20 may also be fabricated with a plate or plates that bolt to a vertical support (not shown).

Inside the horizontal tube of the bearing tee is an injection-molded polymer bearing, or the like, that has an inside shape conforming to torque tube 16, and a round outside diameter. This bearing may be made from a polymer material such as UHMW polyethylene with UV inhibitors and may be filled with a lubricant. This bearing may be formed by two separate pieces to facilitate installation into the tee housing.

Spur-gear rack 30, D-ring chain drive assembly 34 or cable drive system (not shown), is connected to torque tube 16 preferably in the center of the tracker row. A circular gear or D-ring chain drive assembly 30 allows for a constant leverage point to resist wind-load forces applied to the array. Linear actuator driven systems translate linear motion into rotary motion, and must resist higher loads due to the fact that the attachment of the actuator to the torque tube changes angle as a cosine function white the tracker rotates. This results in the linear actuator having to resist higher loads than a circular gear or chain drive system. Worm-drive gearbox 26 is mounted to one or two of the center support columns 22 of the tracker, and coupled to a spur-gear rack, D-ring chain drive 30 or cable drive. Each tracker row worm-drive gearbox 26 is connected to the next using rotating drive shafts 28. The design of worm-gear drive 26 and linkage system eliminates the transfer of wind-load forces to the linkage. The worm-gear drive mechanism 26 resists the wind-load forces locally, within the tracker supports, at each tracker. This design incorporates a rotating drive shaft-linked 28, worm-gear drive system 26 to rotate many trackers with one motor.

Figure 5:
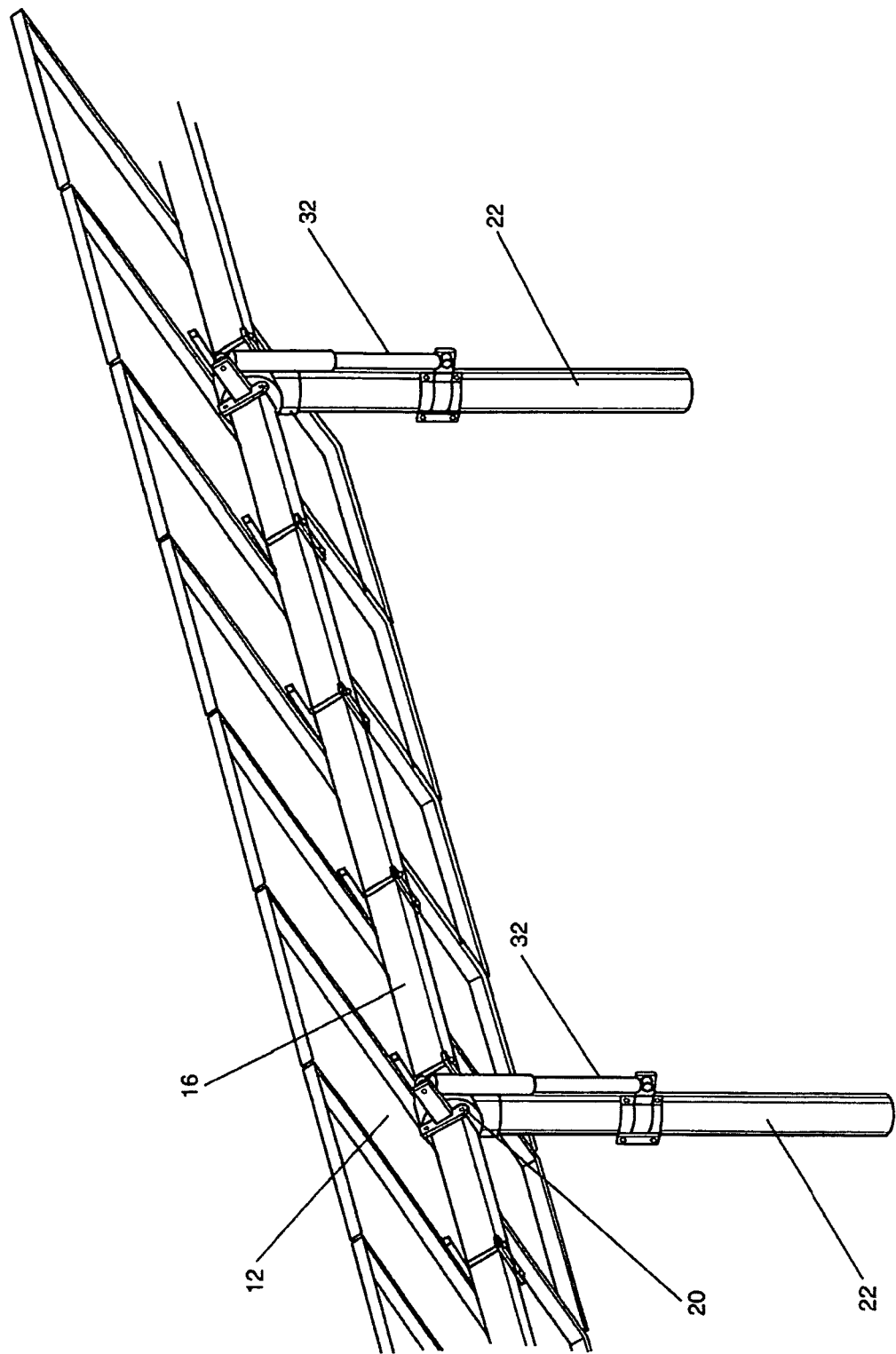
FIG. 5 is an elevation showing hydraulic dampeners installed on each tracker row to enable greater capacity per row.

As shown in FIG. 5, harmonic dampeners 32 may be installed along the length of torque tube 16 at column locations 22, to decouple the structure from wind-induced forces. Harmonic dampeners 32 increase the number of modules that can be mounted onto a longer torque tube 16 without increasing the stiffness and cost of the supporting structure. Using dampeners 32 eliminates the need to increase the size of torsion tube 16, while allowing more modules 12 to be mounted onto the same cross-section size tube 16. The result is that the center of gravity of the array remains close to bearings 20, which minimizes the overhung weight loading to the drive system and spreads the cost of the gear drive over a larger tracker row size.

As shown in FIGS. 1A and 2, a row of single solar modules 12 connects to a torsion tube 16 with a mounting apparatus 18 comprising a module frame clamp, a module laminate connection or a module-mounting rail. Connection 18 to torque tube 16 may be made using a square bend U bolt or two bolts and a plate to form a clamp around torque tube 16 or module mounting rails. This arrangement forms a long row of solar modules 12 that rotate east and west as drive system 14 rotates torque tube 16. An important consideration is to minimize the over-hung rotational moment that the overhung weight of the modules creates. This may be accomplished by directly connecting the module frames to torque tube 16, or if necessary, using a module rail with a minimum depth, or offset, from the surface of torque tube 16.

Mechanically Linked Tilted S/A Tracker

Figure 6:
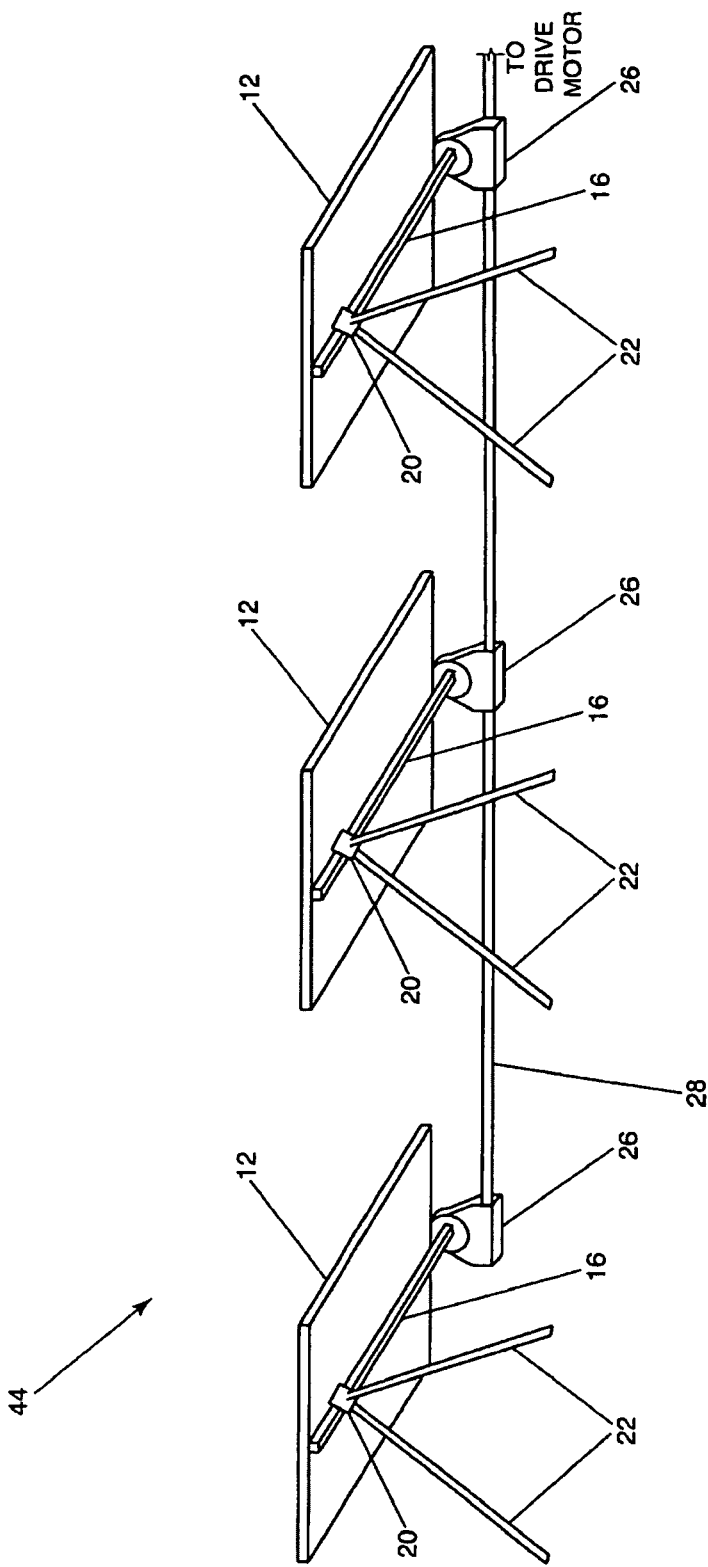
FIG. 6 shows the mechanically linked worm-drive gearbox incorporated into a tilt and roll solar tracker.

The mechanically linked tilt and roll, single axis 44 embodiment of the present invention is a tracking system for pointing one or more solar panels or PV modules 12 towards the sun, and is shown in FIG. 6. Drive mechanism (not shown) as previously described, provides the power and linkage to move PV modules 12 via drive shaft 28. Drive mechanism utilizes a rotating torsion tube 16, in this case, tilted, in the North/South direction, incorporating mounting rails on which PV modules 12 are mounted. Torsion tube 16 is inserted into the upper bearing 20, with bearing surfaces such as no maintenance polymer bushings, which is attached to the upper support columns 22. A combination thrust and radial bearing can be incorporated into worm-drive gearbox 26 to resist the downward and radial forces exerted on the array. As previously described, motor (not shown) drives a worm-gear drive box 26, which in turn, rotates the torsion tube 16 directly or drives a secondary element, which in turn drives the torsion tube. A spur gear rack or D-ring chain drive, as previously described can be affixed to torsion tube (not shown). Thus, when activated by drive mechanism, PV modules 12 are rotated. Thusly, one motor can drive a plurality of drive mechanisms. The mechanically linked tilt and roll tracker 44 exploits the same "one way" drive mechanism as the horizontal tracking system embodiment and thereby transmits only the forces necessary to rotate the PV array and the wind forces are resisted locally within each tracker array.

Mechanically Linked Fixed Tilt Azimuth Tracker

Figure 7:
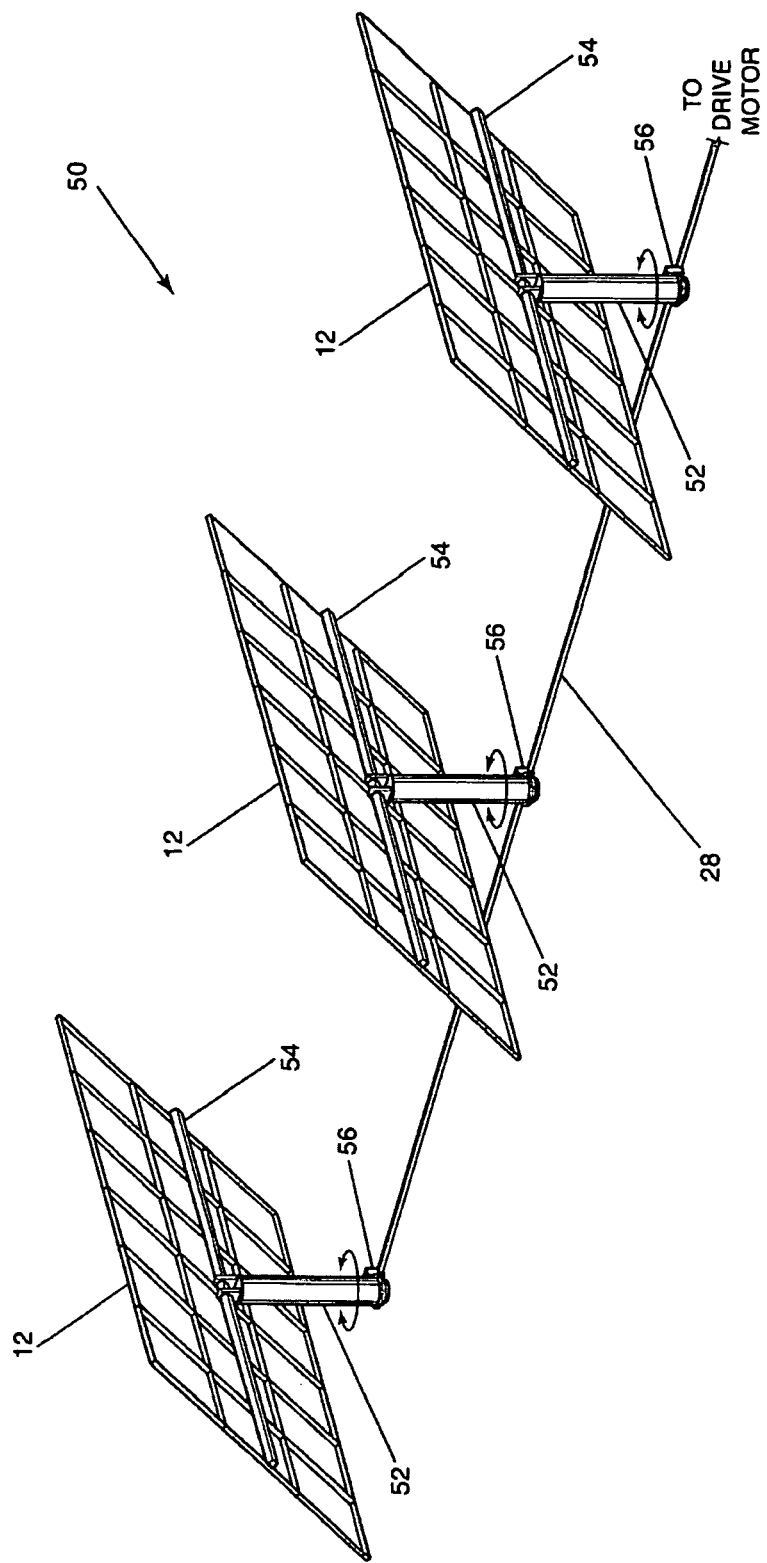
FIG. 7 shows the mechanically linked worm-drive gearbox incorporated into a fixed tilt azimuth tracker.
Figure 8A:
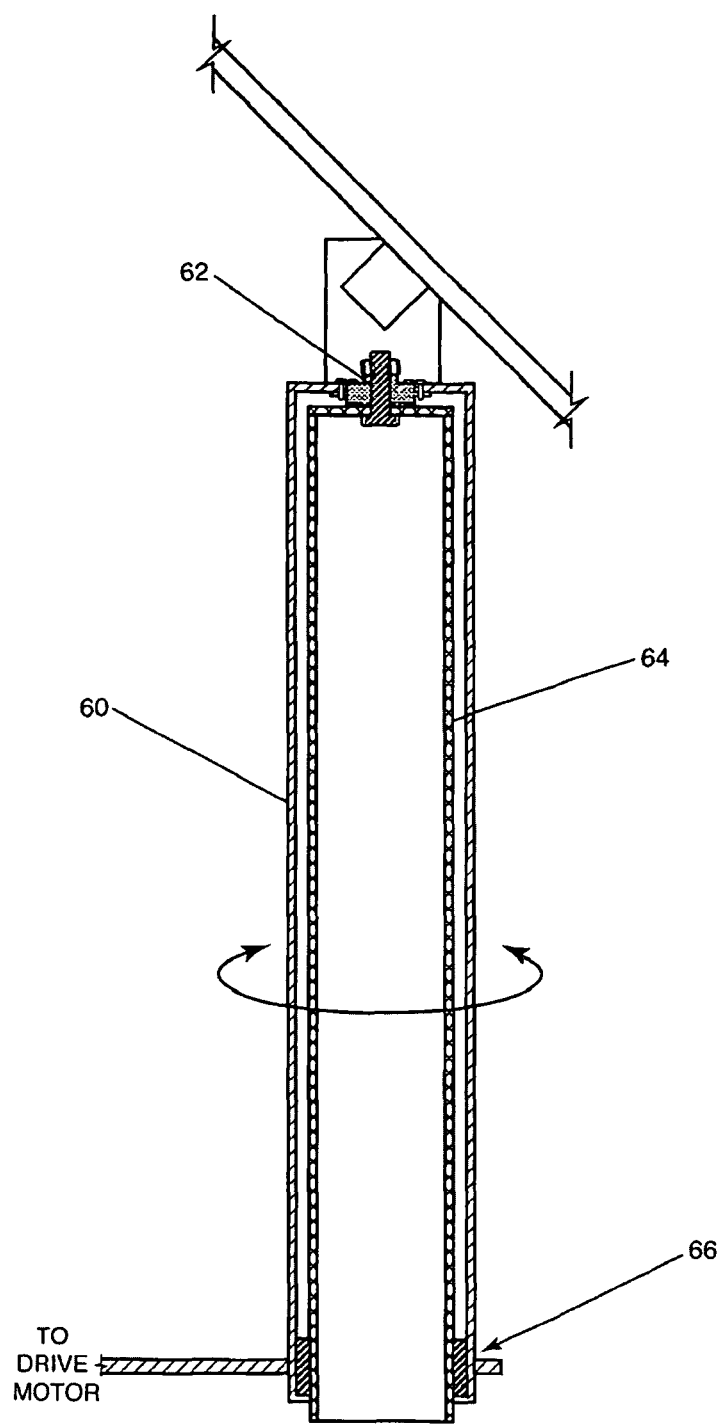
FIG. 8A shows the rotating support tube assembly of FIG. 7.
Figure 8B:
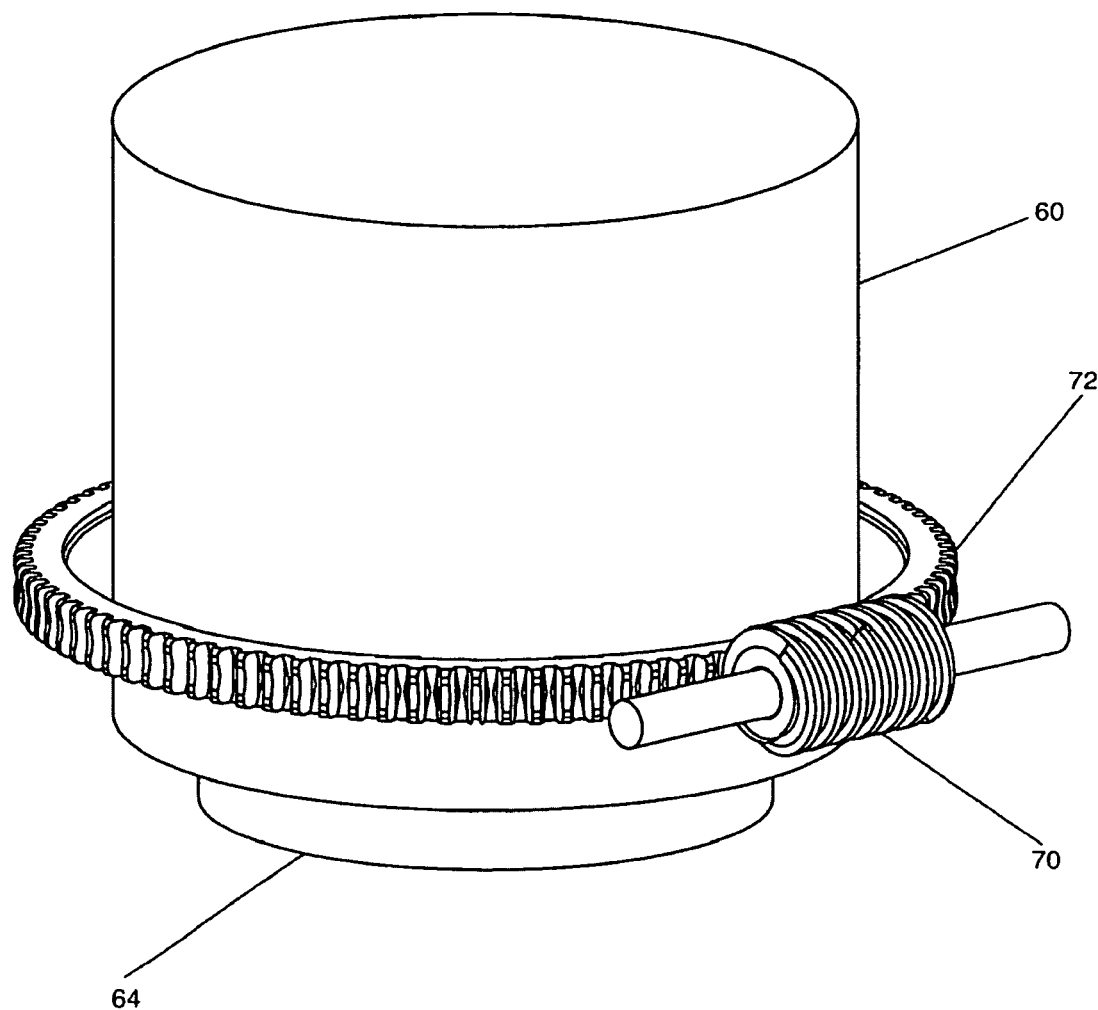
FIG. 8B shows a worm gear assembly affixed to the vertical support of a fixed tilt azimuth tracker.

The mechanically linked fixed tilt azimuth single axis tracker 50 embodiment of the presently claimed invention is shown in FIG. 7. This embodiment is also a tracking system for pointing one or more solar panels or PV modules 12 towards the sun. The preferred drive mechanism was previously described and is similar to the description. Drive mechanism utilizes a rotating support tube assembly 52, in this case, vertical, and incorporating a structure with mounting rails 54 on which PV modules 12 are mounted. As in the previous embodiments, a worm-gear assembly 56 is driven by drive shaft 28 which in turn rotates outer vertical tube 58 along with mounted PV modules 12. The rotating tube assembly 52 is shown in FIG. 8A. Outer vertical support tube 60 is inserted over top bearings 62 that are affixed to the top and the circumference of inner vertical support tube 64. Top bearing 62 preferably includes a thrust and radial bearing surface as achieved for example with a tapered roller bearing. Drive motor (not shown), as previously described, drives worm-gear drive box 66, which in turn, rotates the torsion tube 68 directly or drives a secondary element which in turn drives the torsion tube (not shown). A spur gear rack or D-ring chain drive can also be affixed to torsion tube 68, as previously described. To more clearly shown the drive mechanism for this embodiment, FIG. 8B shows a close up view of worm 70 driving circular worm gear 72, causing outer vertical support tube 60 to rotate. Thus, when activated by drive mechanism PV modules 12 are rotated. Another design of the fixed tilt azimuth tracker incorporates a slew drive bearing and worm-drive mechanism to rotate and support the PV array. The gear drive is located sufficiently low on the support structure so that the rotating linkage does not interfere with the PV modules as they rotate. For a mechanical linkage as shown in FIG. 7, drive shaft 28 is driven by a motor through a worm-gear drive box 56 which in turn is affixed to a second drive mechanism for concurrently rotating a second set of PV modules 12. Thusly, one motor 24 can drive a plurality of drive mechanisms. The mechanically linked fixed tilt azimuth tracker exploits the same "one way" drive mechanism as the horizontal tracking system embodiment thereby resisting the wind forces locally within each tracked array.

Mechanically Linked Carousel Azimuth Tracker

Figure 9:
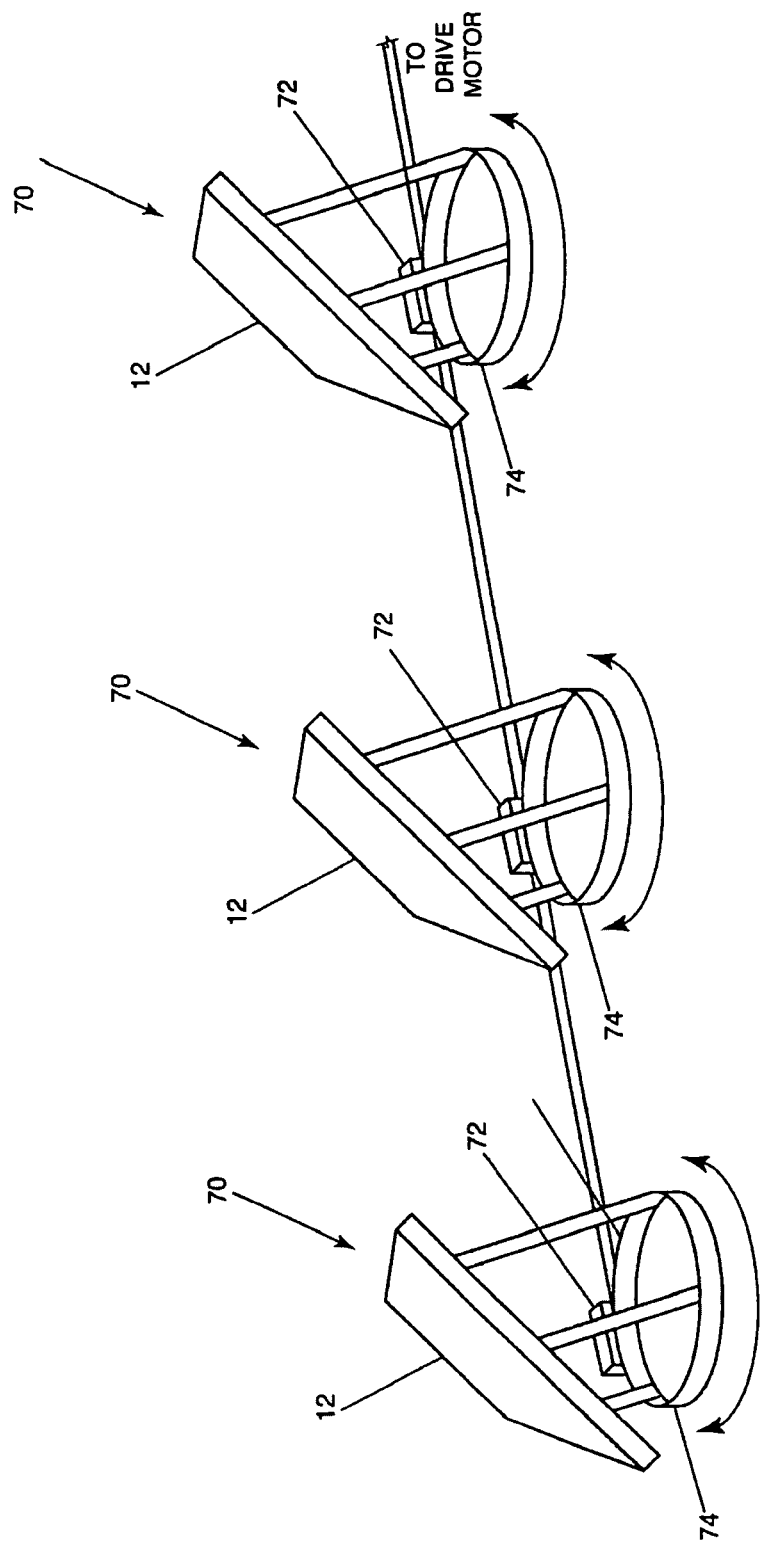
FIG. 9 shows the mechanically linked worm-drive gearbox incorporated into a fixed tilt carousel solar tracker.

The mechanically linked carousel azimuth tracker is shown in FIG. 9. The mechanically linked carousel azimuth single axis tracker embodiment of the presently claimed invention is also a tracking system for pointing one or more solar panels or PV modules 12 towards the sun. Drive mechanism, previously described, provides the power and linkage to move PV modules 12 for each carousel tracker assembly 70. In this embodiment, each carousel tracker assembly 70 is rotated in unison, as shown. Drive mechanism provides the power and linkage to move PV modules via drive shaft 28. Drive mechanism utilizes a mechanically linked worm-drive gearbox 72 in conjunction with a large diameter, bearing ring 74 on which PV array 12 rotates. Worm-drive gearbox 72 rotates large diameter ring 74 through the uses of a secondary assembly such as a rack and pinion gear, chain drive or cable drive system (not shown). Rotating drive shaft 28 rotates the worm which in turn rotates the worm-gear which then rotates a spur gear, pulley or chain sprocket which rotates large diameter bearing ring 74. The bearing incorporates both radial and thrust bearing surfaces. These bearing surfaces may be constructed of polymer bushings, or machined rollers. PV array 12 of carousel tracker 70 may also be configured in a low profile to minimize wind loads and may be suitable for use on rooftop applications. Carousel tracker 70 exploits the same mechanically linked "one way" drive mechanism as the horizontal tracking system embodiment and thereby allowing many trackers to be driven by one motor. The external wind forces on the trackers are resisted locally within each tracked array.

Tracker Controller

The microprocessor tracker control system may incorporate a global positioning system (OPS) to obtain location and time information and to automatically update and compensate for the internal clock drift of the electronics. Time, date, and location information will be used by the microprocessor controller to calculate the solar position and move the tracking system to maximize the exposure of the modules to the sun. The solar tracking algorithms are well known and published. The system may also have external inputs such as a wind speed monitor to enable the trackers to be automatically feathered in the event of a severe windstorm. The control system may include a manual override function to manually manipulate the tracker position for installation or maintenance. This control system may also incorporate diagnostics, such as tracker functionality and/or array output monitoring.

The control system interacts with the motorized portion of the drive system and the data collection system. The gear-drive assembly will incorporate a position feedback mechanism, preferably digital, to allow the microprocessor to move the tracker into a desired position and keep track of whether the tracker is functioning properly. The motorized assembly incorporates an end of travel indicator that will allow the microprocessor to know that it is in the "end" position so that the motor will not drive the trackers past their mechanical limits and will allow the position of the tracker will reset itself once per day by the end of travel indicator such that there will be no accumulation of position error. The motor should incorporate a means of dynamic overload protection. If the tracker fails to move due to mechanical failure or motor overload, the control system should be capable of detecting the malfunction, stop the operation, and record or transmit the information.

Many or the motorized tracker drives may be connected to a single controller in either a wired or wireless network configuration. Multiple master controllers in a large solar field configuration may be networked together. The control system may record and communicate current tracker positions. It may also record and communicate faults in the tracker system to a supervisory control system. Other enhancements to the control system may include PV output monitoring on each tracker.

Since the entire module output falls to near zero if it is partially shaded, it is necessary to incorporate a back-tracking scheme which will rotate the modules in the opposite direction of the sun in order to eliminate one tracker from shading another in the early morning and evening as the sun is close to the horizon. The backtracking scenario may be calculated from the sun angle, the height of the array and the spacing between trackers. Individual trackers may backtrack at different rates based upon the mounting height of the trackers in relation to the adjoining trackers.

For smaller installations where fewer trackers are installed, a simpler optical, closed loop tracking system can be used instead of the open loop microprocessor control as described above.

Although this description referred to PV modules, the presently claimed invention can also be used to track solar heat collectors, building shade systems, sunlight exposure testing of materials, and other systems that require tracking of the sun.

Although the claimed invention has been described in detail with particular reference to these preferred embodiments, other embodiments can achieve the same results. Variations and modifications of the presently claimed invention will be obvious to those skilled in the art and it is intended to cover in the appended claims all such modifications and equivalents. The entire disclosures of all references, applications, patents, and publications cited above, are hereby incorporated by reference.

What is claimed is:

1. A linked tracker system for driving a plurality of individual solar tracker assemblies displaced in a large field for following the motion of the sun relative to the earth, the linked tracker system comprising:
    a single driving apparatus for rotating a plurality of linked drive shafts configured to drive mechanically linked multiple rows of the individual solar tracking assemblies, at least one drive shaft from the plurality of drive shafts affixed to each solar tracking assembly and the at least one drive shaft being minimally constructed to withstand the forces of being driven by the single driving apparatus;
    a worm-gear box assembly directly mounted to one or more support columns anchored to the ground and connected to the each solar tracker assembly for providing motion by the driving apparatus to the each solar tracker assembly to avoid transmitting of external forces exerted on the each solar tracker assembly to the plurality of linked drive shafts between the worm-drive gear boxes and to transmit the external forces to the one or more anchored support columns, said worm-gear box assembly affixed and driven by the at least one drive shaft;
    wherein the at least one drive shaft comprise articulating joints for compensating for non-linearity between trackers in a horizontal and a vertical direction.

2. The linked tracker system of claim 1 wherein the plurality of solar trackers comprise a horizontal tracking configuration.

3. The linked tracker system of claim 1 wherein the at least two solar trackers comprise a multiple tilt and roll configuration.

4. The linked tracker system of claim 1 wherein the at least two solar trackers comprise a fixed tilt azimuth configuration.

5. The linked tracker system of claim 1 further comprising at least one harmonic dampener affixed between a torsion tube of a photovoltaic (PV) module assembly and the one or more support columns.

6. The linked tracker system of claim 5 further comprising at least one bearing assembly disposed on the torsion tube.

7. The linked tracker system of claim 1 wherein the driving apparatus comprises a brake for resisting motor coast and back forces.

8. The linked tracker system of claim 1 wherein the plurality of solar trackers are configured to move in unison.

9. A method for tracking the movement of the sun relative to the earth by driving a plurality of individual solar trackers assemblies in a large field with a single driving apparatus and for resisting external forces locally within each solar tracker of the plurality solar trackers, the method comprising the steps of:
rotating a plurality of linked drive shafts with the single driving apparatus, at least one drive shaft from the plurality of linked drive shafts affixed to each solar tracking assembly and the at least one drive shaft being minimally constructed to withstand the forces of being driven by the single driving apparatus;
driving a worm-gear box assembly mounted to one or more support columns and affixed at the each solar tracker assembly by the at least one drive shaft, the worm-gear box assemblies providing substantially unison motion to the plurality of solar trackers;
resisting a transmission of external forces on the at least one drive shaft by coupling the worm-drive gear box to the each solar tracker assembly; and
transmitting the external forces to the one or more grounded support columns by directly mounting the worm-gear box to the one or more grounded support columns; further comprising the step of compensating for non-linearity between trackers in a horizontal and a vertical direction by affixing articulating joints to the at least one drive shaft.

10. The method of claim 9 wherein the substantially unison motion comprises the step of moving the at least two solar trackers about a horizontal axis.

11. The method of claim 9 wherein the substantially unison motion comprises the step of moving the at least two solar trackers in a multiple tilt and roll direction.

12. The method of claim 9 wherein the substantially unison motion comprises the step of moving the at least two solar trackers in a fixed tilt azimuth direction.

13. The method of claim 9 further comprising the step of dampening wind induced harmonic forces with at least one harmonic dampener.

14. The method of claim 9 further comprising the step of resisting low back forces in the single driving apparatus.

15. A linked tracker system for driving a plurality of individual solar tracker assemblies displaced in a large field for following the motion of the sun relative to the earth, the linked tracker system comprising:
a single driving apparatus for rotating a plurality of linked drive shafts configured to drive mechanically linked multiple rows of the individual solar tracking assemblies, at least one drive shaft from the plurality of drive shafts affixed to each solar tracking assembly and the at least one drive shaft being minimally constructed to withstand the forces of being driven by the single driving apparatus;
a worm-gear box assembly directly mounted to one or more support columns anchored to the ground and a mechanical linkage between the worm-gear box assembly and the each solar tracker assembly, wherein the mechanical linkage comprises a member from the group consisting of a spur gear rack, a D-ring chain assembly and a cable drive assembly for driving a torsion tube disposed on the each solar tracker assembly, connected to the each solar tracker assembly for providing motion by the driving apparatus to the each solar tracker assembly to avoid transmitting of external forces exerted on the each solar tracker assembly to the plurality of linked drive shafts between the worm-drive gear boxes and to transmit the external forces to the one or more anchored support columns, said worm-gear box assembly affixed and driven by the at least one drive shaft.

16. The linked tracker system of claim 15 wherein the plurality of solar trackers assemblies comprise a horizontal tracking configuration.

17. The linked tracker system of claim 15 wherein the at least one drive shaft comprise articulating joints for compensating for non-linearity between trackers in a horizontal and a vertical direction.

18. The linked tracker system of claim 15 further comprising at least one harmonic dampener affixed between a torsion tube of a photovoltaic (PV) module assembly and the one or more support columns.

19. The linked tracker system of claim 15 wherein the driving apparatus comprises a brake for resisting motor coast and back forces.

20. The linked tracker system of claim 15 wherein the plurality of solar tracker assemblies are configured to move in unison.

21. A method for tracking the movement of the sun relative to the earth by driving a plurality of individual solar trackers assemblies in a large field with a single driving apparatus and for resisting external forces locally within each solar tracker of the plurality solar trackers, the method comprising the steps of:
rotating a plurality of linked drive shafts with the single driving apparatus, at least one drive shaft from the plurality of linked drive shafts affixed to each solar tracking assembly and the at least one drive shaft being minimally constructed to withstand the forces of being driven by the single driving apparatus;
driving a worm-gear box assembly mounted to one or more support columns and affixed at the each solar tracker assembly by the at least one drive shaft, the worm-gear box assemblies providing substantially unison motion to the plurality of solar trackers;
mechanically linking the worm-gear box assembly and the each solar tracking assembly with a mechanical linkage comprising a member from the group consisting of a spur gear rack, a D-ring chain assembly and a cable drive assembly for driving a torsion tube disposed on the each solar tracker assembly;
resisting a transmission of external forces on the at least one drive shaft by coupling the worm-drive gear box to the each solar tracker assembly; and
transmitting the external forces to the one or more grounded support columns by directly mounting the worm-gear drive box to the one or more grounded support columns.

22. The method of claim 21 wherein the substantially unison motion comprises the step of moving the plurality of solar tracker assemblies about a horizontal axis.

23. The method of claim 21 further comprising the step of compensating for non-linearity between trackers in a horizontal and a vertical direction with articulating joints affixed to the at least one drive shaft.

24. The method of claim 21 further comprising the step of dampening wind induced harmonic forces with at least one harmonic dampener.

25. The method of claim 21 further comprising the step of resisting low back forces in the single driving apparatus.

\* \* \* \* \*